United States Patent [19]

Nelle

[11] 4,156,137

[45] May 22, 1979

[54] PHOTOELECTRIC MEASURING DEVICE WITH PHOTOCELL VIGNETTING

[75] Inventor: Günther Nelle, Siegsdorf, Fed. Rep. of Germany

[73] Assignee: Firma Dr. Johannes Heidenhain GmbH, Traunreut, Fed. Rep. of Germany

[21] Appl. No.: 663,810

[22] Filed: Mar. 4, 1976

[30] Foreign Application Priority Data

Mar. 8, 1975 [DE] Fed. Rep. of Germany ....... 2510273

[51] Int. Cl.² ............................................. H01J 39/12
[52] U.S. Cl. .................................. 250/237 R; 250/201
[58] Field of Search .................. 250/201, 208, 237 R, 250/237 G, 210, 209, 557, 221; 356/1, 4

[56] References Cited

U.S. PATENT DOCUMENTS

| | | | |
|---|---|---|---|
| 2,227,562 | 1/1941 | Underhill | 250/210 |
| 2,886,717 | 5/1959 | Williamson et al. | 250/237 G |
| 3,778,157 | 12/1973 | Brelot et al. | 356/1 |

Primary Examiner—David K. Moore
Attorney, Agent, or Firm—John J. Pavlak; Gary M. Ropski

[57] ABSTRACT

A top illumination photoelectric measuring installation to determine the relative positions of two objects is disclosed which includes an optical reflection grid scale and a transmission grid sensor plate laterally with respect to each other and photoelectric elements to receive light reflected from the scale. In this installation, the photoelectric elements are arranged to accomplish a vignetting of the photo-sensitive surface of the photoelectric elements whenever the operating distance between the scale and the sensor plate is such that further movement of the scale and the sensor plate toward one another would produce a photo current greater than that which can be tolerated by the amplifier connected to the photo elements and provided that the admissable range of tolerance is not exceeded. Such an arrangement permits a greater range of operating distances between the sensor plate and the scale than could be achieved under a normal operating arrangement.

10 Claims, 2 Drawing Figures

PHOTOELECTRIC MEASURING DEVICE WITH PHOTOCELL VIGNETTING

The invention relates to a photoelectric top illumination measuring system to determine the relative position of two objectives, comprising a scale designed as an optical reflection grid and a sensor plate located immediately therebefore, designed as a transmission grid, through which the scale is fed appropriately obliquely illuminated from the top and the reflected share of light is preferably supplied to photoelectric building components connected in push-pull. The objectives, the relative positions of which are to be determined, may be the table and/or bed of a production or measuring machine.

The problem solved by the invention consists of creating a top illumination measuring system which is distinguished by particularly simplified design and which permits wide fluctuation in the operating distance between the scale and the sensor plate, without adversely affecting the function of the measuring system. The measuring system according to the invention is furthermore distinguished by a compact and small design which allows for a versatile application.

The invention solves the problem posed in a top illumination measuring installation of the initially described kind in that the photoelectric building elements are so arranged in the ray path of the illumination that, upon going below a certain operating distance still within the admissible range of tolerance between the scale and the sensor plate, a vignetting of the photosensitive surface of the aforementioned photoelectric components is accomplished. As a result of this measure, large extension tolerances can be accomplished in top illumination measuring systems without additional constructive measures.

The vignetting of the photo-sensitive surface of the photo elements is carried out for the following reason: With decreasing working distance between the scale and the sensor plate, the photo current increases as is known. Conversely, with increasing working distance, the photo current decreases. However, in view of the necessary signal amplification, such an increase and decrease of the photo current, caused by fluctuations in distance, may take place only within determined narrow ranges because in this special application the amplifiers are only operationally safe if the input signals do not drop below a certain minimum value and do not exceed a certain maximum value. Distortions of the signal result in the event of a modulation of the amplifier beyond the admissible modulation range. According to the method of the invention, the arrangement of the photoelectric construction components in the radiation path of the illumination is such that, in the event of a decrease in a working distance between the scale and the sensor plate still within the admissible range of tolerance, an increasing vignetting of the photo-sensitive surface of the photo element and thus a reduction of the photo current will take place. This means that large fluctuations in distance between the scale and the sensor plate are possible within the admissible modulation range of the amplifier, even with very fine grid gratuations, without causing an adverse effect on the function of the measuring system. The rough extension tolerances achieved with the invention facilitate the mounting of the measuring system at the machine.

Additional features and advantages of the invention are described in, and will appear from, the description of the preferred embodiments which follow and from the drawing which schematically represents an embodiment of the invention and to which reference is now made.

Figure 1:
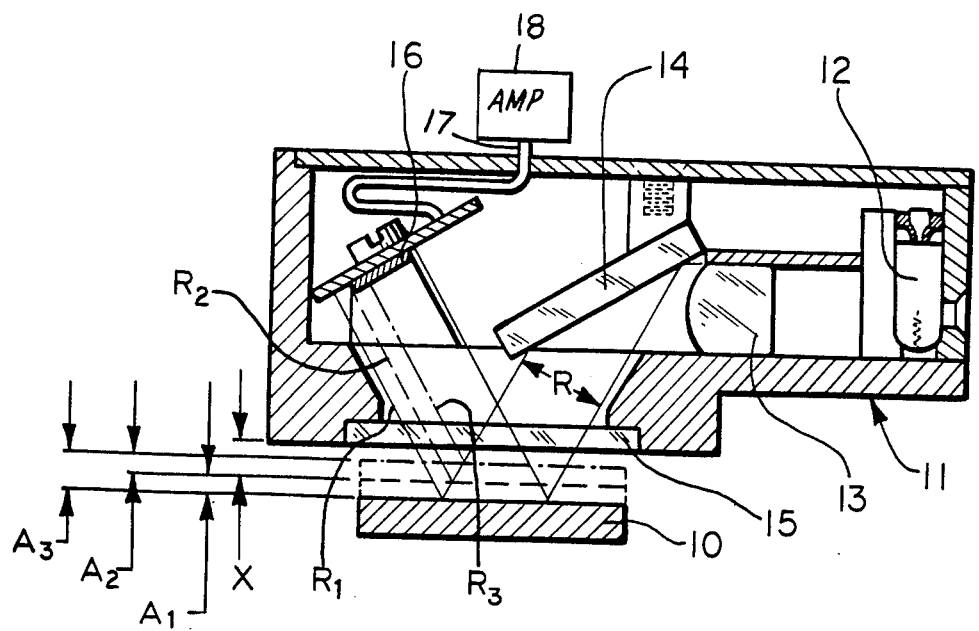
FIG. 1 is a section through the top illumination measuring system according to the invention.

In FIG. 1, reference numeral 10 identifies the scale, a known optical reflection grid. The sensor assembly 11 which scans the reflection grid 10 comprises a lamp 12, a condensor lens 13, a reversing mirror 14, a scanning or sensor plate 15 as well as photoelectric building components 16 placed back to back and perpendicular to the drawing surface. In one advantageous embodiment, four photo elements 16 are contemplated and connected in pairs in push-pull. The sensor plate 15 is an optical transmission grid.

The light from the lamp 12 falls through condensor lens 13 which limits the cross-section of the illuminating ray cluster R and through the sensor plate 15 to the scale 10, by which it is reflected, passes once more through the translucent gaps of the sensor plate 15 and impinges upon the photo elements 16. As the scale 10 is moved laterally relative to the sensor assembly 11, fluctuations in brightness are created at the photo elements 16 which then convert them into electrical signals. The aforementioned electrical signals are amplified by an amplifier 18 and processed further in any known manner. The output 17 of the sensor unit 11 may be connected for example to an electronic countup/countdown counter which appropriately also includes an amplifier and signal former phases (triggers). Such an electronic counter which is not the subject of the invention is disclosed in the German petty Pat. No. 7,413,290 and thus is not explained in detail herein.

In FIG. 1, the photo elements 16 according to the invention are so adjusted that in case of fluctuations in distance between the scale 10 and the sensor plate 15 an increasing vignetting of the photo sensitive area of the photo elements 16 takes place. That way rough mounting tolerances can be accomplished for the sensor assembly 11.

As illustrated in FIG. 1, the photo elements 16 are so arranged that when scale 10 is at a distance X from sensor plate 15, the marginal ray $R_2$ of the cluster of rays R impinges on the marginal borderline of the photo sensitive area of photo elements 16. The distance X corresponds to the distance at which the photo current I is at the maximum possible value which can be accepted by the amplifier 18 to which photo elements 16 are connected. This is also the mean distance of the permissable movement of scale 10 with respect to sensor plate 15.

Any movement of the scale 10 closer to sensor plate 15 results in a vignetting of the photo sensitive surface of the photo elements 16 since a protion of the photo sensitive surface is not illuminated by rays from the cluster of rays R. This vignetting increases as the distance between scale 10 and the sensor plate 15 becomes less and less. Any movement of the scale 10 beyond the distance S causes the photo sensitive surface of the photo elements to be completely illuminated.

Figure 2:
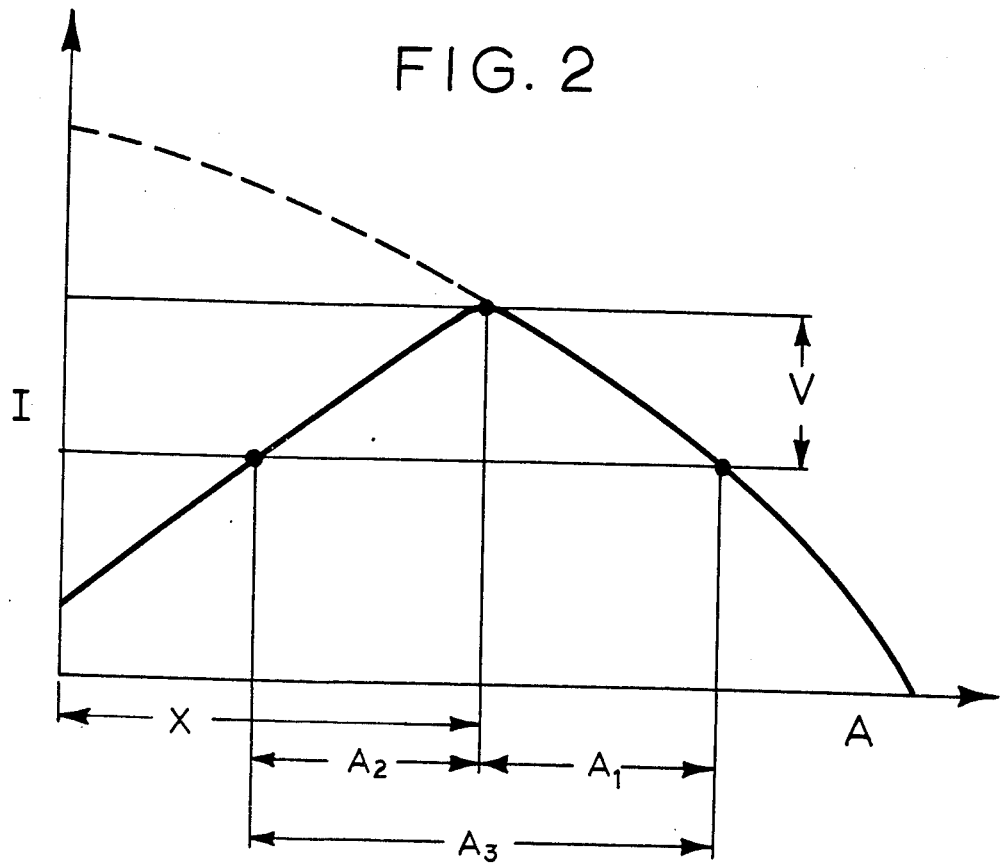
FIG. 2 is a diagram illustrating the dependency of the photo current on the operating distance.

FIG. 2 shows the dependency of the photo current I on the operating distance A. In this diagram, the photo current I represents the signal amplitude of two photo elements connected in push-pull. V identifies the admissible modulation range of the amplifier 18. The operating distance $X+A_1$ identifies the maximum admissable distance between scale 10 and sensor plate 15. When dropping below the working distance X the vignetting of the photo sensitive surface of the photo elements starts, thus causing reduction of the photo current I. The operating distance $X-A_2$ identifies the minimum admissible distance between scale 10 and sensor plate 15. $A_2$ identifies the working distance gained additionally by the vignetting of the photo elements 16. $A_3$ represents the total admissible working distance and/or mounting tolerance between the scale 10 and the sensor plate 15.

The embodiments described herein are intended to be exemplary of the types of photoelectric measuring installations which fall within the scope of the invention. However, one skilled in the art would certainly be expected to be able to make modifications and variations of these embodiments without departing from the spirit and scope of the invention as it is defined in the following claims.

What is claimed is:

1. In a photoelectric measuring system to determine the relative position of two objects, having an optical reflection scale and a sensor assembly including a source of oblique illumination for the reflection scale, a transmission grid and photoelectric elements, and in which system, the oblique source of illumiation transmits light which is reflected by the scale and then impinges upon the photoelectric elements wherein both transmitted source illumination and reflected illumination pass through said transmission grid and wherein the relative lateral displacement between the reflection scale and the sensor assembly is measured, the improvement comprising the arrangement of the photoelectric elements in the path of the reflected illumination so that a vignetting of the photosensitive surfaces of the photoelectric elements occurs when the operating distance between the transmission grid and the reflection scale is less than a predetermined distance.

2. The photoelectric measuring system of claim 1, wherein the predetermined distance is the distance at which the photocurrent produced by the photoelectric elements is the maximum photocurrent which can be accepted by an amplifier to which the photoelectric elements are connected.

3. The photoelectric measuring system of claim 1, wherein the photoelectric elements are arranged so that a portion of the entire photosensitive surfaces of the photoelectric elements is not illuninated when the distance is less than the predetermined distance.

4. The photoelectric measuring system of claim 1, wherein the photoelectric elements are connected in push-pull.

5. The photoelectric measuring system of claim 3, wherein the vignetting increases and the photocurrent produced by the photoelectric elements decreases as the distance between the sensor assembly and the reflection scale decreases.

6. A photoelectric measuring system to determine the relative position of two objects, comprising:
   a source of an illuminating ray path;
   an optical reflection scale for reflecting the illuminating ray path;
   an optical transmission grid between the source of the illuminating ray path and the reflection scale through which the illuminating ray path obliquely passes both before and after it is reflected by the reflection scale; and
   one or more photoelectric elements having photosensitive surfaces for producing photocurrent in response to the reflected illuminating ray path, the photoelectric elements being adapted for connection to an amplifier which measures the photocurrent and being arranged in the reflected illuminating ray path so that the entire photosensitive surfaces of the photoelectric elements are not illuminated when the operating distance between the reflection scale and the transmission grid is less than a predetermined distance and the entire photosensitive surfaces are illuminated when the operating distance is greater than the predetermined distance.

7. The photoelectric measuring system of claim 6, wherein the predetermined distance is the distance at which the photocurrent produced by the photoelectric elements is the maximum photocurrent which can be safely accepted by the amplifier to which said photoelectric elements are to be connected.

8. The photoelectric measuring system of claim 6, wherein there are four photoelectric elements connected in pairs in push-pull.

9. In a photoelectric top illumination measuring system to determine the relative position of two objects, having an optical reflection scale and a sensor assembly including a source of oblique illumination for the reflection scale, photoelectric elements, the output of which is connected to an amplifier, and an optical transmission grid located between the reflection scale and the source of illumination and the photoelectric elements, the improvement comprising the arrangement of the photoelectric elements in the path of the illumination reflected by the reflection scale so that a vignetting of the photosensitive surfaces of the photoelectric elements occurs when the distance between the photoelectric elements and the reflection scale is less than the distance at which the photocurrent produced by the photoelectric elements is the maximum photocurrent which can be accepted by the amplifier.

10. The photoelectric measuring system of claim 9, wherein the photoelements are positioned so that the entire photosensitive surfaces of the photoelectric elements are not illuminated when the distance is less that the distance at which the maximum acceptable photocurrent is generated and the entire photosensitive surfaces of the photoelectric elements are illuminated when the distance is greater than the distance at which the maximum acceptable photocurrent is generated.

* * * * *